(12) United States Patent
Shaw et al.

(10) Patent No.: US 12,738,783 B1
(45) Date of Patent: Sep. 15, 2026

(54) AXIAL FLUX MACHINE AND LOW-PROFILE COOLING APPARATUS

(71) Applicant: E-Circuit Motors, Inc., Needham Heights, MA (US)

(72) Inventors: Steven Robert Shaw, Bozeman, MT (US); George Harder Milheim, Bozeman, MT (US); Mark Puglia, Brookline, MA (US)

(73) Assignee: E-Circuit Motors, Inc., Needham Heights, MA (US)

( * ) Notice: Subject to any disclaimer, the term of this patent is extended or adjusted under 35 U.S.C. 154(b) by 0 days.

(21) Appl. No.: 19/399,978

(22) Filed: Nov. 25, 2025

Related U.S. Application Data

(60) Provisional application No. 63/799,082, filed on May 2, 2025.

(51) Int. Cl.

| | |
|---|---|
| ***H02K 1/2796*** | (2022.01) |
| ***H02K 1/18*** | (2006.01) |
| ***H02K 1/20*** | (2006.01) |
| ***H02K 1/32*** | (2006.01) |
| ***H02K 15/40*** | (2025.01) |
| ***H02K 16/04*** | (2006.01) |

(52) U.S. Cl.
CPC ........... *H02K 1/2796* (2022.01); *H02K 1/182* (2013.01); *H02K 1/20* (2013.01); *H02K 1/32* (2013.01); *H02K 15/40* (2025.01); *H02K 16/04* (2013.01); *H02K 2201/03* (2013.01); *H02K 2211/03* (2013.01); *H02K 2213/03* (2013.01)

(58) Field of Classification Search
CPC .. H02K 1/2793; H02K 1/2795; H02K 1/2796; H02K 1/182; H02K 1/20; H02K 1/32; H02K 15/40; H02K 16/04; H02K 2201/03; H02K 2211/03; H02K 2213/03
See application file for complete search history.

(56) References Cited

U.S. PATENT DOCUMENTS

| | | | |
|---|---|---|---|
| 6,664,673 | B2 | 12/2003 | Lopatinsky et al. |
| 7,070,392 | B2 | 7/2006 | Bradbury et al. |

(Continued)

FOREIGN PATENT DOCUMENTS

| | | | | |
|---|---|---|---|---|
| EP | 2863524 A | 4/2015 | | |
| EP | 2689516 B1 * | 5/2015 | ............. | H02K 37/00 |
| GB | 2485185 A | 9/2012 | | |

*Primary Examiner* — Tulsidas C Patel
*Assistant Examiner* — Joshua M Rodriguez
(74) *Attorney, Agent, or Firm* — Pierce Atwood LLP

(57) ABSTRACT

An axial flux machine may include a rotor, a first stator, and a second stator. The rotor may generate first magnetic flux within an active region and may have a first generally annular surface oriented normal to its axis of rotation. The first stator may generate second magnetic flux within the active region so that interaction of the second magnetic flux and the first magnetic flux causes the rotor to rotate. The second stator may include at least a first electronic component to be cooled and may have a second generally annular surface positioned in close proximity to and generally parallel to the first generally annular surface so that rotation of the first generally annular surface relative to the second generally annular surface induces flow of a cooling fluid for the first electronic component within a gap between the first generally annular surface and the second generally annular surface.

30 Claims, 4 Drawing Sheets

(56) References Cited

U.S. PATENT DOCUMENTS

| | | | |
|---|---|---|---|
| 7,109,625 | B1 | 9/2006 | Jore et al. |
| 9,673,688 | B2 | 6/2017 | Shaw |
| 9,800,109 | B2 | 10/2017 | Shaw |
| 10,170,953 | B2 | 1/2019 | Shaw |
| 10,211,694 | B1 | 2/2019 | Shaw |
| 11,005,322 | B2 | 5/2021 | Milheim et al. |
| 11,121,614 | B2 | 9/2021 | Milheim |
| 11,336,130 | B1 | 5/2022 | Shaw et al. |
| 11,509,179 | B2 | 11/2022 | Lee et al. |
| 11,527,933 | B2 | 12/2022 | Shaw et al. |
| 11,626,779 | B2 | 4/2023 | Shaw et al. |
| 11,751,330 | B2 | 9/2023 | Milheim et al. |
| 2007/0013251 | A1* | 1/2007 | Djuric ...................... H02K 3/28 310/113 |
| 2017/0126079 | A1* | 5/2017 | Klassen ................... B25J 17/00 |
| 2021/0096445 | A1 | 4/2021 | Zhu |
| 2021/0135526 | A1* | 5/2021 | Guedes-Pinto ...... H02K 1/2795 |
| 2023/0396130 | A1 | 12/2023 | Liu et al. |
| 2025/0047148 | A1 | 2/2025 | Semidey et al. |

* cited by examiner

AXIAL FLUX MACHINE AND LOW-PROFILE COOLING APPARATUS

RELATED APPLICATIONS

This application claims the benefit under 35 U.S.C. § 119(e) of U.S. Provisional Application Ser. No. 63/799,082, entitled AXIAL FLUX MACHINE AND LOW-PROFILE COOLING APPARATUS, filed May 2, 2025, the entire contents of which are incorporated herein by reference for all purposes.

BACKGROUND

Axial flux motors and generators described by several patents, including U.S. Pat. Nos. 7,109,625; 9,673,688; 9,800,109; 10,170,953; 10,211,694; 11,005,322; 11,121,614; 11,336,130; 11,527,933; 11,626,779; 11,751,330, the entire contents of which are incorporated herein by reference, feature a generally planar printed circuit board stator (PCB) assembly interposed between magnets magnetized with alternating north-south poles. Machines built according to the teachings of these patents and related art have stators that are built using printed circuit board techniques. These stators, and the associated energy conversion devices, can be made axially thin. Further, machines of this kind can be made with opposing rotors (e.g., as described in U.S. Pat. No. 7,109,625), or with single-sided rotors.

SUMMARY

In some aspects, the techniques described herein relate to an axial flux machine, including: a rotor configured to generate first magnetic flux within an active region of the axial flux machine, the rotor being configured to rotate about an axis of rotation and having a first surface oriented normal to the axis of rotation; a first stator configured to generate second magnetic flux within the active region so that interaction of the second magnetic flux and the first magnetic flux causes the rotor to rotate about the axis of rotation; and a second stator including at least a first electronic component to be cooled, the second stator have a second surface positioned in close proximity to and parallel to the first surface so that rotation of the first surface relative to the second surface induces flow of a cooling fluid for the first electronic component within a gap between the first surface and the second surface.

In some aspects, the techniques described herein relate to a method for assembling an axial flux machine, including: moving an assembly including a rotor and a first stator toward a second stator including at least a first electronic component to be cooled so as to cause the assembly to engage the second stator, wherein: the rotor is configured to generate first magnetic flux within an active region of the axial flux machine; the first stator is configured to generate second magnetic flux within the active region so that interaction of the second magnetic flux and the first magnetic flux causes the rotor to rotate about an axis of rotation; and the rotor is configured and arranged so that rotation of the rotor induces flow of a cooling fluid for the first electronic component.

DETAILED DESCRIPTION

Figure 1:
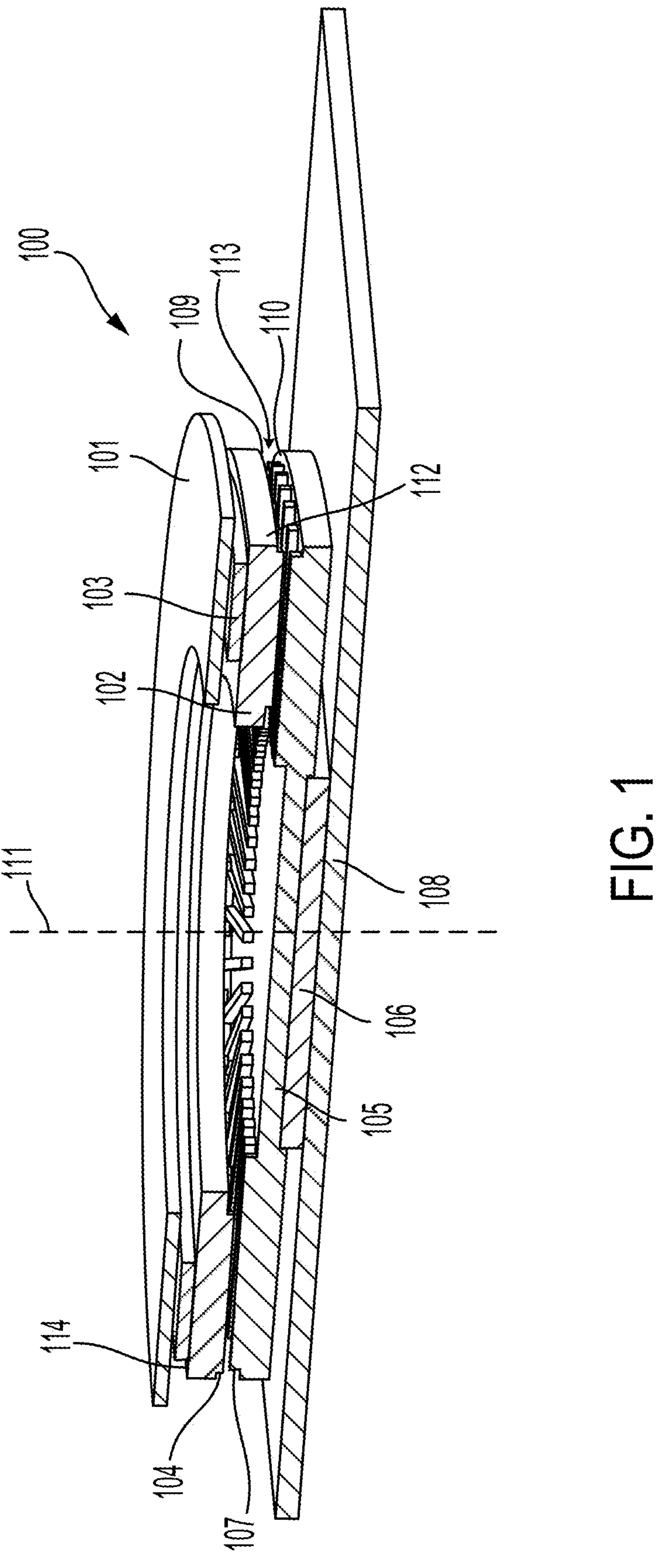
FIG. 1 shows a cross-sectional view of a first example implementation of a PCB stator axial flux motor and cooling assembly, configured in accordance with some aspects of the present disclosure.

Configuring motors in accordance with the present disclosure may flexibly allow such motors to be used in cooling applications, such as removing heat from a graphics processing unit (GPU), central processing unit (CPU), or similar electronic circuit, in which minimal height may be critical. In some implementations, an axial flux machine, e.g., a PCB stator axial flux machine, may be configured to produce a flow, e.g., of air, over a cooling surface of a micro-electronic chip or other electrical component. Advantageously, the motor and fluid pump may be integrated. In some implementations, the integrated motor and fluid pump may essentially conform to the surface of a generally planar heat-producing component, such that a combination of the rotor and heat producing component form the pump (or fan). In some implementations, the rotor of the motor may form, on its opposing surface, the rotor of the pump, and the heat-producing component(s) may form the stator of the pump.

The dual use and efficient integration offered by at least some of the design disclosed herein may enable decreases in the height of the electronic component and associated cooling mechanism, without the need for ducts and similar mechanisms, e.g., when overall thinness is desired in devices such as cell phones, tablets, displays, hand-held computers and instrumentation, communications equipment, laptops, and similar devices.

The basic physical mechanism of parallel plate flow, where radial flow is induced by the relative rotation of an upper and lower plate, is known. Such flow mechanisms exist in axial flux machines of the kind described in the above-noted patents, and can cause significant effects at higher speed, particularly when provisions are made for circulation driven by this physical mechanism. Such provisions might include, for example, holes or slots provided in the rotor. In a machine of typical construction, e.g., a rotor-stator-rotor axial flux machine, there are two domains in which these flow conditions may be important—these are the gaps between stator and the two rotors. This is the situation in machines designed for high-torque operation, for example, to drive an external mechanical load.

Offered are assemblies in which an axial flux machine, e.g., a PCB stator axial flux machine, is integrated with or affixed to one or more components that require airflow for cooling. In such assemblies, there may be at least one gap between a first stator (e.g., a PCB stator) and a rotor (which may include magnetic materials or conductive materials), and there may be a relative rotational velocity across that gap. The rotor may also be positioned in close proximity to a surface of a second stator that includes the component(s) to be cooled, e.g., on opposite side of the rotor, thus forming a second gap between the rotor and the surface. In some implementations, the second stator may include a thermally conductive component that is in thermal communication with one or more heat-producing electronic components (e.g., a GPU, a CPU, or the like). For example, in some implementations, the electronic component(s) to be cooled may be disposed on a printed circuit board and the thermally conductive component may overlay the electronic component(s) such that a surface of the thermally conductive component faces a surface of the rotor to create fluid flow as described herein. Such a thermally conductive component may be made, for example, of copper, aluminum, or ceramic, and may serve to increase the effective surface area of the electronic component(s) to be cooled. In other implementations, the surface of the second stator may be a surface of a heat-producing electronic component itself, e.g., without an overlaying thermally conductive component.

Fluid flow (e.g., air flow) to the second gap may be provided through a central opening of the motor assembly. As described in more detail below, in some implementations, various parameters may be adjusted in the design of such a motor to enhance and/or regulate the fluid flow over the heat-producing electronic component(s). Examples of such parameters include (A) the size and/or position of the central opening, (B) the presence and/or shape of one or more features on a portion of the rotor that faces the component(s) to be cooled and/or (C) the presence and/or shape of one or more features on a portion of the second stator (e.g., on a thermally conductive component) that faces the rotor.

It can thus be appreciated that, in such implementations, the rotor of the motor may also serve as the rotor of the pump, with the component(s) to be cooled and/or the thermally conductive component overlaying such component(s) being positioned to serve as the stator of the pump. This is contrast to a cooling system in which a motor drives a pump, and airflow generated by the pump is channeled to a component to be cooled. The disclosed designs may thus offer advantages in terms of overall height, size, and other aspects of cooling system integration.

As the disclosed apparatuses address a common problem (i.e., heat mitigation), there are numerous solutions in the marketplace. Typically, such solutions involve a fan integrated with a motor, as a unit, which is then coupled to a heatsink. The heatsink is often made of aluminum or copper. The heat sink is then connected, thermally, to the to-be-cooled electronic component. This thermal interface is often enhanced with a paste or thermally conductive conformal pad. In some devices, such as laptops, the fan may be located some distance from the component to be cooled to minimize the overall height of the assembly, which allows the end-use product to be thinner. The disclosed technique is differentiated from existing solutions at least in that it may employ an axial flux motor, e.g., a PCB stator motor, which potentially offers a reduction in axial profile and an enhancement in reliability. It is also differentiated from existing solutions in that the air-movement mechanism is integrated in the motor itself and, in in at least some implementations, acts directly on the to-be-cooled component(s). In some implementations, even further reductions in height may be achieved by co-design of the hermetic cap on a chip to interface with and receive the rotor and motor portion of the cooling system.

FIG. 1 shows a first example implementation an assembly 100 configured in accordance with some aspects of the present disclosure. As shown in FIG. 1, the assembly 100 may include a motor stator (a PCB stator 101), a rotor component 102 supporting one or more magnets 103, and a pump stator (which may include a thermally conductive component 105 and/or a one or more to-be-cooled electronic components 106). In some implementations, the magnets 103 may be arranged on the rotor component 102 to form an annular Halbach array, which is a specific arrangement of permanent magnets configured in a ring or cylindrical shape, designed to create a strong, focused magnetic field on one side of the array while minimizing or canceling the field on the opposite side. Such a configuration may be achieved by strategically orienting the magnetization direction of each magnet segment within the annulus. An example configuration of magnet segments arranged in an annular Halbach array on a rotor component is described below in connection with FIG. 4. As explained in relation to FIG. 4, arranging the magnets 103 in the form of a Halbach array may enable the thickness and/or weight of rotor component 102, as well as the assembly 100 as a whole, to be reduced significantly.

As shown in FIG. 1, in some implementations, the rotor component 102 may include a lower surface 109 and the pump stator (e.g., the thermally conductive component 105 and/or the electronic component(s) 106) may include an upper surface 110 that faces the lower surface 109, with a gap 113 being formed between the lower surface 109 and the upper surface 110. The lower surface 109 and the upper surface 110 may each be generally shaped as an annulus. In this regard, it should be appreciated that, in some implementations, the generally annular lower surface 109 and/or the generally annular upper surface 110 may be portions of surfaces of other shapes. For instance, in some implementations, the upper surface 110 of the pump stator may be an annular region of a square or rectangular upper surface area of the thermally conductive component 105 and/or an annular region of a square or rectangular upper surface area of an electronic component 106.

As explained in more detail below, rotation of the generally annular lower surface 109 relative to the generally annular upper surface 110, due to their close proximity to one another, may induce a radially outward flow of a cooling fluid (e.g., air) within the gap 113. As illustrated, in some implementations, the lower surface 109 of the rotor component 102 may include features 104 that extend into the gap 113, which features 104 may modify the flow characteristics within the gap 113. In the illustrated example, the features 104 are elongated ribs that extend in a radial direction relative an axis of rotation 111 of the rotor component 102. In other implementations, the features 104 may additionally or alternatively take on one or more other forms, such as one or more spiral ribs or cavities, one or more bumps, one or more indentations, or the like. Advantageously, the rotor component 102 may serve as the rotor for both the motor (e.g., via the magnets 103 attached to an upper surface 114 of the rotor component 102) and the pump (e.g., via the lower surface 109 of the rotor component 102, possibly enhanced with features 104).

The upper surface 110 of the pump stator (e.g., the thermally conductive component 105 and/or electronic component(s) 106) may serve as the stator of the pump. In implementations that employ a thermally conductive component 105, the thermally conductive component 105 may additionally provide a thermal path to the electronic component(s) 106, which may, for example, be attached to a printed circuit board 108. As illustrated, in some implementations, the upper surface 110 of the pump stator may include features 107 that increase the surface area and/or modify fluid flow characteristics within the gap 113. Similar to the features 104, in the illustrated example, the features 107 are elongated ribs that extend in a radial direction relative to the axis of rotation 111 of the rotor component 102. In other implementations, the features 107 may additionally or alternatively take on one or more other forms, such as one or more spiral ribs or cavities, one or more bumps, one or more indentations, or the like.

In some implementations, the axial gap distance between the generally annular lower surface 109 of rotor component 102 and the generally annular upper surface 110 of the pump stator may be small enough that the natural fluid dynamics of boundary layers and viscous drag will cause a cooling fluid (e.g., air) to gently and efficiently move from an inner radial region to an outer radial region of the gap 113. In some implementations, for instance, a ratio of (A) a maximum axial distance between an uppermost portion of the generally annular lower surface 109 of the rotor component 102 and a lowermost portion of the generally annular upper surface 110 of the pump stator to (B) a radial distance between the axis of rotation 111 of the rotor component 102 and an outer diameter 112 of the rotor component 102 may be less than or equal to 0.5. It can thus be appreciated that, for at least some designs, the maximum axial distance between the uppermost portion of the generally annular lower surface 109 of the rotor component 102 and the lowermost portion of the generally annular upper surface 110 of the pump stator may be less than or equal to 2.0 millimeters. For implementations in which the lower surface 109 includes the features 104, the uppermost portion of the generally annular lower surface 109 may be a portion of the lower surface 109 located between the features 104. Similarly, for implementations in which the upper surface 110 includes the features 107, the lowermost portion of the upper surface 110 may a portion of the upper surface 110 located between the features 107. It should be appreciated that, as used herein, the terms "upper," "lower," "uppermost," and "lowermost" are not intended to refer to a particular orientation with respect to gravity or the earth, and are instead intended only to refer to relative positions of elements as illustrated in the various figures.

Figure 2:
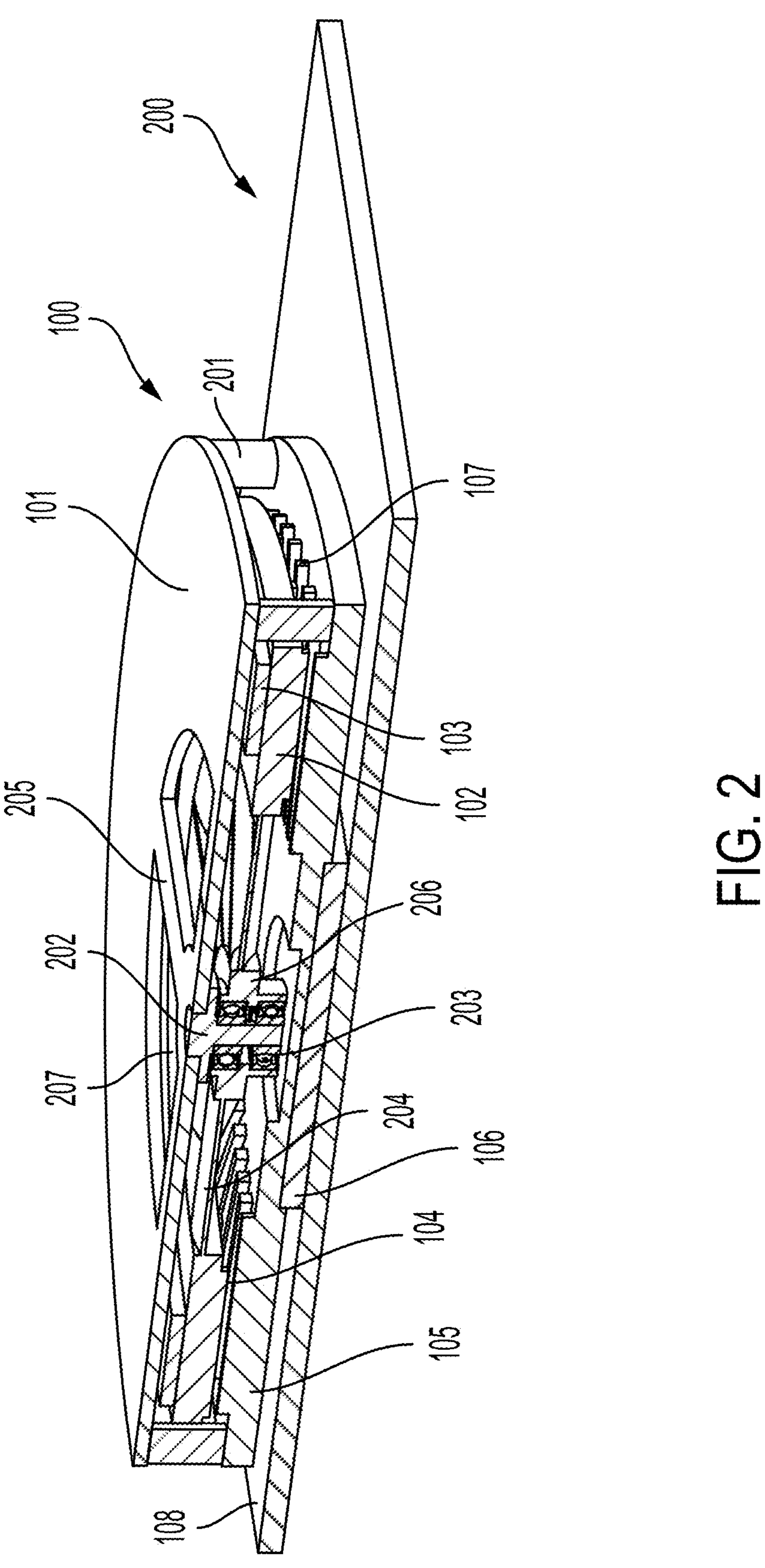
FIG. 2 shows a cross-sectional view of a second example implementation of a PCB stator axial flux motor and cooling assembly, configured in accordance with some aspects of the present disclosure, and which also includes examples of bearings and supports to allow rotation of the rotor relative to the stators, in accordance with some aspects of the present disclosure.

FIG. 2 shows a second example implementation of an assembly 200 configured in accordance with some aspects of the present disclosure. As can be seen, the assembly 200 includes all of the same components, arranged in the same way, as the assembly 100, but additionally includes outer axial supports 201 positioned to support the PCB stator 101 above the thermally conductive component 105 and/or the component(s) 106, as well as an inner axial support 202, bearing components 203, radial supports 204, 205, and a hub component 206, which are configured and arranged to allow rotation of the rotor component 102 relative to each of the motor stator (e.g., the PCB stator 101) and the pump stator (e.g., the thermally conductive component 105 and/or the electronic component(s) 106). In the illustrated example, the bearing components 203 are disposed between the inner axial support 202 and the hub component 206 to allow the hub component 206 to rotate relative to the inner axial support 202, the inner axial support 202 is fixedly attached to the PCB stator 101 via the radial supports 205, and the radial supports 204 support the rotor component 102 via the hub component 206. In some implementations, one or more of the radial supports 204 may be shaped as airfoils or otherwise configured to help move fluid (e.g., air) in an axial direction through one or more openings 207 in the assembly 200.

Figure 3:
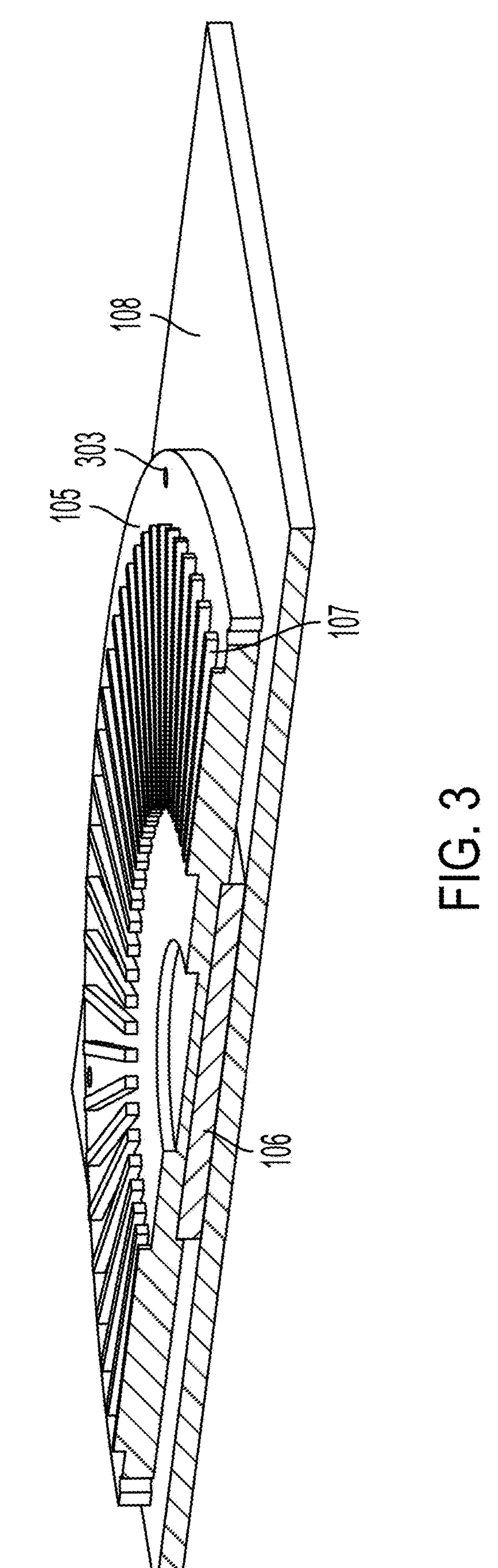
FIG. 3 illustrates how an assembly including a PCB stator and a rotor component can be installed onto a thermal stator and/or a host circuit board during a pick-and-place assembly operation, in accordance with some aspects of the present disclosure.

As shown in FIGS. 2 and 3, in some implementations, the PCB stator 101 may fully support rotor component 102 and attached magnets 103 (e.g., via the radial supports 205, the inner axial support 202, and the hub component 206, and the radial supports 204, or otherwise) as well as the outer axial supports 201, thus allowing an assembly 302 (see FIG. 3) including the PCB stator 101, the rotor component 102, and the outer axial supports 201, and to be handled as unit. In some implementations, for instance, a pick-and-place machine 208 may grab and move the assembly 302 to an appropriate position over the thermally conductive component 105 and/or the electronic component(s) 106 during an assembly operation.

FIG. 3 illustrates how, in some implementations, one or more of the outer axial supports 201 of the assembly 200 may include snap top standoffs or similar components that include one or more features 301 that provide a spring action that allows an assembly 302 (including the PCB stator 101, the rotor component 102, and the outer axial supports 201) to be locked into place over the pump stator (e.g., the thermally conductive component 105 and/or the electronic component(s) 106) after being inserted into appropriately sized corresponding holes 303 in the pump stator and/or the printed circuit board 108, e.g., as illustrated by an arrow 304 in FIG. 3.

A finite element computer simulation of the heat transfer coefficient of an assembly similar to that shown in FIGS. 1-3, but with plain faces on the rotor and stator (i.e., not including any features 104, 107), and the rotor turning at 9000 rpm, showed a significant improvement in heat rejection capacity of the structure, as compared to the absence of a cooling system. In the disclosed design, the thermal path to the air can be very short.

Figure 4:
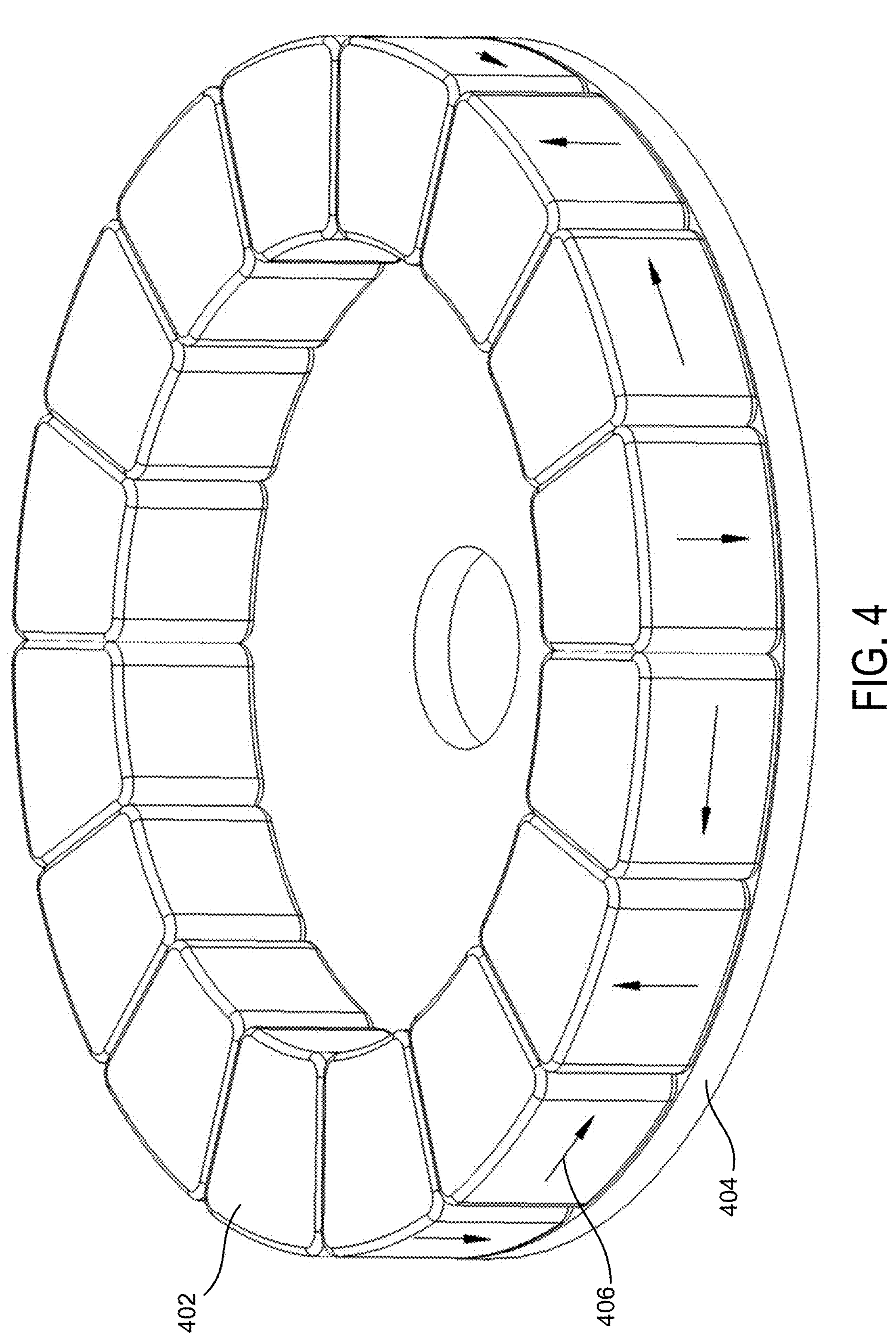
FIG. 4 shows an example configuration of magnet segments arranged in an annular Halbach array on a rotor component that may be employed in the assemblies shown in FIGS. 1-3, in accordance with some aspects of the present disclosure.

FIG. 4 shows an example configuration of magnet segments 402 arranged in an annular Halbach array on a rotor component 404. The thickness of the magnet segments 402 depicted in FIG. 4 has been exaggerated for illustrative purposes. Arrows 406 in FIG. 4 indicate the magnetization direction of the respective magnet segments 402. Because the magnet segments 402 which are magnetized in the theta direction provide a flux return path to the next pole, the rotor component 404 does not need to provide a flux return path and can thus be made thinner than would otherwise be possible using a rotor component 404 that needs to provide a flux return path between poles. As noted above, in some implementations the magnets 103 of the rotor component 102 of the assemblies 100, 200 can be arranged in such a Halbach array. In some such implementations, the rotor component 102 may be made of a light-weight, non-magnetic material, e.g., carbon fiber, and may be designed to have a very thin (e.g., generally flat) profile. Accordingly, by arranging the magnet segments 103 on the rotor component 102 of the assembly 100, 200 in the form an annular Halbach array, such as illustrated in FIG. 4, the overall thickness and/or weight of the assembly 100, 200 can be reduced significantly, as the rotor component 102 needs only to provide adequate structural support for the magnet segments 103.

As noted above, one possible advantage of the assemblies 100, 200 is their extremely low profile nature, making them particularly well suited for applications in which the headroom above heat-producing electronic components is limited, such as processors or other heat-producing components mounted on circuit boards of laptop computers, smart phones, etc. One measure of the low-profile nature of the assemblies 100, 200 is their overall height. By employing one or more of the configurations and/or techniques disclosed herein, in some implementations, the assemblies 100, 200 may be configured such that a maximum axial distance between an uppermost portion of the motor stator (e.g., an upper surface of the PCB stator 101) and a lowermost portion of the pump stator (e.g., a lower surface of the thermally conductive component 105 and/or the to-be-cooled electronic component(s) 106) is less than or equal to 10 millimeters (mm), or less than or equal to 9 mm, or less than or equal to 8 mm, or less than or equal to 7 mm. Another measure of the low-profile nature of assemblies 100, 200 is their height-to-width ratio. In some implementations, the assemblies 100, 200 may be configured such that a ratio of (A) a maximum axial distance between an uppermost portion of the motor stator (e.g., an upper surface of the PCB stator 101) and a lowermost portion of the pump stator (e.g., a lower surface of the thermally conductive component 105 and/or the to-be-cooled electronic component(s) 106) to (B) a radial distance between the axis of rotation 111 of the rotor component 102 and the outer diameter 112 of the rotor component 102 may be less than or equal to 0.25, or less than or equal to 0.225, or less than or equal to 0.20.

The following clauses describe example implementations of an apparatus configured in accordance with some aspects of the present disclosure.

Clause 1. An axial flux machine, comprising: at least one rotor configured to generate first magnetic flux within an active region of the axial flux machine, the at least one rotor being configured to rotate about an axis of rotation and having a first surface oriented normal to the axis of rotation; a first stator configured to generate second magnetic flux within the active region so that interaction of the second magnetic flux and the first magnetic flux causes the at least one rotor to rotate about the axis of rotation; and a second stator including at least one electronic component to be cooled, the second stator have a second surface positioned in close proximity to and parallel to the first surface so that rotation of the first surface relative to the second surface induces flow of a cooling fluid for the at least one electronic component within a gap between the first surface and the second surface.

Clause 2. The axial flux machine of clause 1, wherein the at least one rotor includes a plurality of magnets configured and arranged to generate the first magnetic flux.

Clause 3. The axial flux machine of clause 2, wherein the plurality of magnets are disposed on first axial side of the at least one rotor and the first surface is disposed on a second axial side, opposite the first axial side, of the at least one rotor.

Clause 4. The axial flux machine of clause 2 or claim 3, wherein the plurality of magnets are arranged to form Halbach array.

Clause 5. The axial flux machine of any of clauses 1-4, wherein the first stator includes windings configured and arranged to generate the second magnetic flux when energized with current.

Clause 6. The axial flux machine of clause 5, wherein the first stator comprises a printed circuit board stator.

Clause 7. The axial flux machine of any of clauses 1-6, wherein the first surface includes first features that extend in the gap and are configured to modify fluid flow characteristics in the gap between the first surface and the second surface.

Clause 8. The axial flux machine of clause 7, wherein an axial extent of the first features is at most 0.2 their radial extent.

Clause 9. The axial flux machine of any of clauses 1-8, wherein the second surface includes second features that extend into the gap and are configured to modify fluid flow characteristics in the gap between the first surface and the second surface.

Clause 10. The axial flux machine of clause 9, wherein an axial extent of the second features is at most 0.2 their radial extent.

Clause 11. The axial flux machine of any of clauses 1-10, wherein: the second stator includes a thermally conductive stator component that overlays the at least one electronic component; and the thermally conductive stator component includes the second surface.

Clause 12. The axial flux machine of any of clauses 1-11, wherein the second stator includes a printed circuit board supporting the at least one electronic component.

Clause 13. The axial flux machine of any of clauses 1-12, wherein the first stator includes a through hole to accommodate flow of the cooling fluid into the gap.

Clause 14. The axial flux machine of any of clauses 1-13, wherein the at least one rotor includes a through hole to accommodate flow of the cooling fluid into the gap.

Clause 15. The axial flux machine of any of clauses 1-14, further comprising a pin or shaft extension extending from at least one face of the first stator, and where the pin or shaft extension is arranged to support the at least one rotor with respect to the first stator.

Clause 16. An axial flux machine, comprising: a rotor configured to generate first magnetic flux within an active region of the axial flux machine, the rotor being configured to rotate about an axis of rotation and having a first generally annular surface oriented normal to the axis of rotation; a first stator configured to generate second magnetic flux within the active region so that interaction of the second magnetic flux and the first magnetic flux causes the rotor to rotate about the axis of rotation; and a second stator including at least a first electronic component to be cooled, the second stator having a second generally annular surface positioned in close proximity to and generally parallel to the first generally annular surface so that rotation of the first generally annular surface relative to the second generally annular surface induces flow of a cooling fluid for the first electronic component within a gap between the first generally annular surface and the second generally annular surface.

Clause 17. The axial flux machine of clause 16, wherein a ratio of a maximum axial distance between an uppermost portion of the first generally annular surface and a lowermost portion of the second generally annular surface to (B) a radial distance between the axis of rotation and an outer diameter the rotor is less than or equal to 0.05.

Clause 18. The axial flux machine of clause 16 or clause 17, wherein a maximum axial distance between an uppermost portion of the first generally annular surface and a lowermost portion of the second generally annular surface is less than or equal to 2.0 millimeters.

Clause 19. The axial flux machine of any of clauses 16-18, wherein a ratio of (A) a maximum axial distance between an uppermost portion of the first stator and a lowermost portion of the second stator to (B) a radial distance between the axis of rotation and an outer diameter the rotor is less than or equal to 0.25.

Clause 20. The axial flux machine of clause any of clauses 16-19, wherein a maximum axial distance between an uppermost portion of the first stator and a lowermost portion of the second stator is less than 10 millimeters.

Clause 21. The axial flux machine of any of clauses 16-20, wherein the rotor includes a plurality of magnets configured and arranged to generate the first magnetic flux.

Clause 22. The axial flux machine of clause 21, wherein the plurality of magnets are disposed on a first axial side of the rotor and the first generally annular surface is disposed on a second axial side, opposite the first axial side, of the rotor.

Clause 23. The axial flux machine of clause 2 or claim 3, wherein the plurality of magnets are arranged to form Halbach array.

Clause 24. The axial flux machine of any of clauses 16-23, wherein the first stator comprises a printed circuit board stator including windings configured and arranged to generate the second magnetic flux when energized with current.

Clause 25. The axial flux machine of any of clauses 16-24, wherein the first generally annular surface includes first features that extend into the gap and are configured to modify fluid flow characteristics in the gap between the first generally annular surface and the second generally annular surface.

Clause 26. The axial flux machine of clause 25, wherein an axial extent of the first features is at most 0.2 their radial extent.

Clause 27. The axial flux machine of any of clauses 16-26, wherein the second generally annular surface includes second features that extend into the gap and are configured to modify fluid flow characteristics in the gap between the first generally annular surface and the second generally annular surface.

Clause 28. The axial flux machine of any of clauses 16-27, wherein: the second stator includes a thermally conductive component that overlays at least a portion of the first electronic component; and the thermally conductive component includes the second generally annular surface.

Clause 29. The axial flux machine of clause 28, wherein a ratio of (A) a maximum axial distance between an uppermost portion of the first stator and a lowermost portion of the thermally conductive component to (B) a radial distance between the axis of rotation and an outer diameter the rotor is less than or equal to 0.25.

Clause 30. The axial flux machine of any of clauses 16-29, wherein the second stator is supported by a printed circuit board.

Clause 31. The axial flux machine of any of clauses 16-30, wherein the first stator includes a through hole to accommodate flow of the cooling fluid into the gap.

Clause 32. The axial flux machine of any of clauses 16-31, wherein the rotor includes a through hole to accommodate flow of the cooling fluid into the gap.

Clause 33. The axial flux machine of any of clauses 16-32, further comprising a first axial support extending from the first stator, wherein the first axial support is configured and arranged to support the rotor with respect to the first stator so that the rotor is rotatable relative to the first stator.

Clause 34. The axial flux machine of any of clauses 16-33, further comprising a second axial support extending from the first stator, wherein the second axial support is configured and arranged to support the first stator relative to the second stator.

Clause 35. The axial flux machine of clause 34, wherein the second axial support includes at least one feature configured to engage a hole in the second stator when the at least one feature is inserted into the hole.

Clause 36. The axial flux machine of clause 35, in combination with a pick-and-place apparatus configured to engage the first stator, move the first stator toward the second stator, and attach the first stator to the second stator by causing the at least one feature to be inserted into the hole.

Clause 37. A method for assembling an axial flux machine, comprising: moving an assembly including a rotor and a first stator toward a second stator including at least a first electronic component to be cooled so as to cause the assembly to engage the second stator, wherein: the rotor is configured to generate first magnetic flux within an active region of the axial flux machine; the first stator is configured to generate second magnetic flux within the active region so that interaction of the second magnetic flux and the first magnetic flux causes the rotor to rotate about an axis of rotation; and the rotor is configured and arranged so that rotation of the rotor induces flow of a cooling fluid for the first electronic component.

Clause 38. The method of clause 37, wherein the second stator has a first generally annular surface oriented normal to the axis of rotation and a second generally annular surface positioned in close proximity to and parallel to the first generally annular surface so that rotation of the first generally annular surface relative to the second generally annular surface induces the flow of the cooling fluid for the first electronic component within a gap between the first generally annular surface and the second generally annular surface.

Clause 39. The method of clause 38, wherein the first stator includes a through hole to accommodate the flow of the cooling fluid into the gap.

Clause 40. The method of any of clauses 37-39, wherein: the assembly includes a first axial support extending from the first stator, the first axial support being configured and arranged to support the rotor with respect to the first stator so that the rotor is rotatable relative to the first stator; and a second axial support extending from the first stator, the second axial support being configured and arranged to engage the second stator and support the first stator relative to the second stator.

Clause 41. The method of clause 40, wherein the second axial support includes at least one feature configured to engage a hole in the second stator, and moving the assembly includes: moving the assembly so that the at least one feature is inserted into the hole.

Clause 42. The method of clause 41, wherein moving the assembly includes: using a pick-and-place apparatus to engage the first stator and move the first stator toward the second stator so that the at least one feature is inserted into the hole.

Clause 43. The method of any of clauses 37-42, wherein: the rotor includes a plurality of magnets disposed on a first axial side of the rotor, the plurality of magnets being configured and arranged to generate the first magnetic flux; and moving the assembly includes moving the assembly to that a second axial side of the rotor, which is opposite the first axial side of the rotor, faces a surface of the second stator.

Clause 44. The method of clause 43, wherein the plurality of magnets are arranged to form a Halbach array.

Clause 45. The method of any of clauses 37-44, wherein the first stator comprises a printed circuit board stator including windings configured and arranged to generate the second magnetic flux when energized with current.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An axial flux machine, comprising:

a rotor configured to generate first magnetic flux within an active region of the axial flux machine, the rotor being configured to rotate about an axis of rotation and having a first generally annular surface oriented normal to the axis of rotation, the rotor having an outer periphery at a first radial distance from the axis of rotation;

a first stator positioned on a first axial side of the rotor, the first stator being configured to generate second magnetic flux within the active region so that interaction of the second magnetic flux and the first magnetic flux causes the rotor to rotate about the axis of rotation; and a second stator positioned on a second axial side of the rotor opposite the first axial side, the second stator including at least a first electronic chip to be cooled via a cooling fluid, at least a portion of the first electronic chip being positioned in a region of the second stator that is located within the first radial distance from the axis of rotation, the second stator having a second generally annular surface positioned in close proximity to and generally parallel to the first generally annular surface so that rotation of the first generally annular surface relative to the second generally annular surface induces flow of the cooling fluid for the first electronic chip within a gap between the first generally annular surface and the second generally annular surface so that heat from the first electronic chip is transferred to the cooling fluid.

2. The axial flux machine of claim 1, wherein a ratio of (A) a maximum axial distance between an uppermost portion of the first generally annular surface and a lowermost portion of the second generally annular surface to (B) a radial distance between the axis of rotation and an outer diameter of the rotor is less than or equal to 0.05.

3. The axial flux machine of claim 1, wherein a maximum axial distance between an uppermost portion of the first generally annular surface and a lowermost portion of the second generally annular surface is less than or equal to 2.0 millimeters.

4. The axial flux machine of claim 1, wherein a ratio of (A) a maximum axial distance between an uppermost portion of the first stator and a lowermost portion of the second stator to (B) a radial distance between the axis of rotation and an outer diameter of the rotor is less than or equal to 0.25.

5. The axial flux machine of claim 1, wherein a maximum axial distance between an uppermost portion of the first stator and a lowermost portion of the second stator is less than 10 millimeters.

6. The axial flux machine of claim 1, wherein the rotor includes a plurality of magnets disposed on the first axial side, the plurality of magnets being configured and arranged to generate the first magnetic flux.

7. The axial flux machine of claim 6, wherein the plurality of magnets are arranged to form a Halbach array.

8. The axial flux machine of claim 1, wherein the first stator comprises a printed circuit board stator including windings configured and arranged to generate the second magnetic flux when energized with current.

9. The axial flux machine of claim 1, wherein the first generally annular surface includes first features that extend into the gap and are configured to modify fluid flow characteristics in the gap between the first generally annular surface and the second generally annular surface.

10. The axial flux machine of claim 9, wherein an axial extent of the first features is at most 0.2 their radial extent.

11. The axial flux machine of claim 1, wherein the second generally annular surface includes second features that extend into the gap and are configured to modify fluid flow characteristics in the gap between the first generally annular surface and the second generally annular surface.

12. The axial flux machine of claim 1, wherein:

the second stator includes a thermally conductive component that overlays at least a portion of the first electronic chip; and the thermally conductive component includes the second generally annular surface.

13. The axial flux machine of claim 12, wherein a ratio of (A) a maximum axial distance between an uppermost portion of the first stator and a lowermost portion of the thermally conductive component to (B) a radial distance between the axis of rotation and an outer diameter of the rotor is less than or equal to 0.25.

14. The axial flux machine of claim 1, wherein the second stator is supported by a printed circuit board.

15. The axial flux machine of claim 1, wherein the first stator includes a through hole to accommodate flow of the cooling fluid into the gap.

16. The axial flux machine of claim 1, wherein the rotor includes a through hole to accommodate flow of the cooling fluid into the gap.

17. The axial flux machine of claim 1, further comprising a first axial support extending from the first stator, wherein the first axial support is configured and arranged to support the rotor with respect to the first stator so that the rotor is rotatable relative to the first stator.

18. The axial flux machine of claim 17, further comprising a second axial support extending from the first stator, wherein the second axial support is configured and arranged to support the first stator relative to the second stator.

19. The axial flux machine of claim 18, wherein the second axial support includes at least one feature configured to engage a hole in the second stator when the at least one feature is inserted into the hole.

20. The axial flux machine of claim 19, in combination with a pick-and-place apparatus configured to engage the first stator, move the first stator toward the second stator, and attach the first stator to the second stator by causing the at least one feature to be inserted into the hole.

21. A method for assembling an axial flux machine, comprising:

moving an assembly including a rotor and a first stator toward a second stator including at least a first electronic chip to be cooled so as to cause the assembly to engage the second stator such that the first stator is positioned on a first axial side of the rotor and the second stator is positioned on a second axial side of the rotor, wherein:

the rotor is configured to generate first magnetic flux within an active region of the axial flux machine;

the first stator is configured to generate second magnetic flux within the active region so that interaction of the second magnetic flux and the first magnetic flux causes the rotor to rotate about an axis of rotation;

the rotor has a first generally annular surface oriented normal to the axis of rotation and an outer periphery at a first radial distance from the axis of rotation; and the assembly is engaged with the second stator such that:

at least a portion of the first electronic chip is positioned in a region of the second stator that is located within the first radial distance from the axis of rotation, and a second generally annular surface of the second stator is positioned in close proximity to and generally parallel to the first generally annular surface so that rotation of the first generally annular surface relative to the second generally annular surface induces flow of a cooling fluid for the first electronic chip within a gap between the first generally annular surface and the second generally annular surface so that heat from the first electronic chip is transferred to the cooling fluid.

22. The axial flux machine of claim 1, wherein the first electronic chip includes at least one of a graphics processing unit or a central processing unit.

23. The method of claim 21, wherein the first stator includes a through hole to accommodate the flow of the cooling fluid into the gap.

24. The method of claim 21, wherein:

the assembly includes a first axial support extending from the first stator, the first axial support being configured and arranged to support the rotor with respect to the first stator so that the rotor is rotatable relative to the first stator; and a second axial support extending from the first stator, the second axial support being configured and arranged to engage the second stator and support the first stator relative to the second stator.

25. The method of claim 24, wherein the second axial support includes at least one feature configured to engage a hole in the second stator, and moving the assembly includes:

moving the assembly so that the at least one feature is inserted into the hole.

26. The method of claim 25, wherein moving the assembly includes:

using a pick-and-place apparatus to engage the first stator and move the first stator toward the second stator so that the at least one feature is inserted into the hole.

27. The method of claim 21, wherein:

the rotor includes a plurality of magnets disposed on the first axial side, the plurality of magnets being configured and arranged to generate the first magnetic flux.

28. The method of claim 27, wherein the plurality of magnets are arranged to form a Halbach array.

29. The method of claim 21, wherein the first stator comprises a printed circuit board stator including windings configured and arranged to generate the second magnetic flux when energized with current.

30. The method of claim 21, wherein the first electronic chip includes at least one of a graphics processing unit or a central processing unit.

* * * * *